United States Patent Office 3,803,214
Patented Apr. 9, 1974

3,803,214
CHOLINE DERIVATIVES AND PROCESS FOR PRODUCING THE SAME
Koji Miura, Kanazawa, and Yasuyuki Suzuki, Noboru Takagawa, Yuji Matumoto, and Kyoko Arai, Toyama, Japan, assignors to Toyama Chemical Company Ltd., Tokyo, Japan
No Drawing. Filed Dec. 27, 1971, Ser. No. 212,750
Claims priority, application Japan, Dec. 28, 1970, 46/127,605; Oct. 7, 1971, 46/79,003
Int. Cl. C07c 69/66
U.S. Cl. 260—484 A      4 Claims

ABSTRACT OF THE DISCLOSURE

Choline derivatives, characterized by the activating effect of a diagnostic function, are produced by reacting choline halide with a reactive derivative of α-acetoxy-α-substituted-acetic acid.

---

This invention relates to novel choline derivatives and to a process for producing said choline derivatives.

The choline derivatives of the present invention are represented by the following General Formula I:

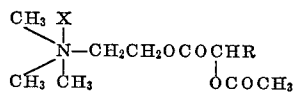

wherein X represents a halogen atom, and R represents a lower alkyl or aryl group.

It is an object of the present invention to provide choline derivatives which have the activating effect of a diagnostic function.

It is another object of the present invention to provide an industrial process for producing choline derivatives.

These and further objects, as will become more apparent when consideration is given to the following detailed disclosure, have been attained by producing choline derivatives (I) of the present invention by the following reactive formulae:

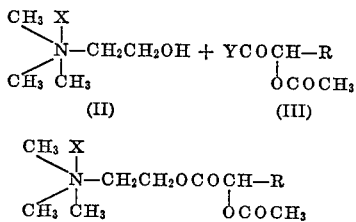

wherein Y represents a reactive group, and X and R are the same as defined above; that is, the choline derivatives of the present invention are obtained by reacting choline halide (II) with a reactive derivative of α-acetoxy-α-substituted-acetic acid (II) to produce α-acetoxy-α-substituted-acetylcholine halide (I).

The symbol R of the compound of Formula III as a starting material of this process includes the lower alkyl groups, such as methyl, ethyl, propyl, etc. and the aryl groups, such as phenyl, naphthyl, etc. Suitable reactive derivatives of the compound of Formula III include, for example, the halide, the ester, the acid anhydrides, etc. Particularly good results are attainable using the halide derivative, such as chlorine, bromine or iodine derivatives.

In carrying out the process of the present invention, the compound of the Formula II may be used in amounts of from the stoichiometric amount to an excess amount based on the quantity of the compound of Formula III. The reaction can be effected in a suitable inert solvent, such as chloroform, dioxane, acetonitrile, etc. and may be carried out at room temperature. Preferably however the reaction is effected at temperatures of from 50° to 60° C. for approximately 6 to 7 hours to provide the compound of the Formula I in high yield.

The pharmacological effects, side effects, and toxicity of the α-acetoxy-α-methylacetylcholine chloride which will be hereinafter called ALC (X is chlorine and R is methyl in the choline derivative of Formula I will now be described.

(A) INCREASE IN THE EFFECT OF SPONTANEOUS MOVEMENT OF ALIMENTARY TRACTS (1) In accordance with the Magnus method 50% effective amount ($ED_{50}$) of ALC was compared with acetylcholine and evaluated by using enucleated duodenum, ileum and the large intestine of mice. Contraction in a dose of $1 \times 10^{-7}$ g./ml. of acetylcholine was determined to 100%. The results are shown in the following Table I.

TABLE I

| Organ | Drug | |
|---|---|---|
| | ALC $ED_{50}$(g./ml.) | Acetylcholine $ED_{50}$(g./ml.) |
| Duodenum | $1.5 \times 10^{-6}$ | $6.0 \times 10^{-9}$ |
| Ileum | $2.7 \times 10^{-6}$ | $6.0 \times 10^{-9}$ |
| Large intestine | $8.9 \times 10^{-6}$ | $4.5 \times 10^{-8}$ |

After 400 mg./kg. of urethane and 20 mg./kg. of pentobarbital were subcutaneously injected into a sample of guinea pigs to narcotize them, the ileum near a cecum was exposed. Two portions of the ileum were fixed and the area near the center thereof was raised with pincers. The movement of the intestinal tube was recorded on a kymograph (Trendenburg method). The drug was orally administered into the stomach using a bougie, after spontaneous movement became constant.

It was found that after 40 minutes following oral administration of 300 mg./kg. of ALC, significant effects were observed, which continued for 4 hours. On the other hand, even after 3 hours following oral administration using 300 mg./kg. of acetylcholine, these effects were not observed.

(B) SIDE EFFECT AND TOXICITY (1) An influence on respiration, blood pressure and electrocardiogram using rabbits was observed with 10 mcg./kg. i.v. in a dose of acetylcholine, but a similar effect was not observed even with 1 mg./kg. i.v. in a dose of ALC.

(2) Acute toxicity ($LD_{50}$) of ALC using mice and rats is shown in the following Table II.

TABLE II

| Animals | Sex | Administration | $LD_{50}$ (mg./kg.) |
|---|---|---|---|
| Mice | ♂ | I.v. | 40.3 |
| | ♀ | I.v. | 40.2 |
| Rats | ♂ | I.v. | 40.9 |
| | ♀ | I.v. | 42.3 |
| Mice | ♂ | S.c. | 573.6 |
| | ♀ | S.c. | 639.6 |
| Rats | ♂ | S.c. | 419.7 |
| | ♀ | S.c. | 417.9 |
| Mice | ♂ | P.o. | 6,800 |
| | ♀ | P.o. | 6,300 |
| Rats | ♂ | P.o. | 3,900 |
| | ♀ | P.o. | 4,100 |

NOTE.—I.v.=Intravenous injection; S.c.=Subcutaneous injection; P.o.=Per os.

The following examples are given by way of illustration only and are not to be construed as limiting unless otherwise specifically specified.

EXAMPLE 1

Process for producing α-acetoxy-α-methylacetylcholine chloride 7 g. (0.05 mol) of choline chloride was suspended in 30 ml. of chloroform and 8.2 g. (0.055 mol) of α-acetoxy-α-methylacetyl chloride was added dropwise thereto at a temperature of 50° to 60° C. The mixture was refluxed for 6 hours. The reaction mixture was concentrated under reduced pressure, and acetone was added to obtain a precipitation of crystals. These crystals were recrystallized with an ethanol-acetone mixture, and 9.5 g. (75%) of white crystals, having a melting point of 160° to 163° C. was obtained.

*Elementary analysis.*—Calculated (percent): C, 47.33; H, 7.94; N, 5.52. Found (percent): C, 47.00; H, 7.76; N, 5.39.

EXAMPLE 2

Process for producing α-acetoxy-α-phenylacetylcholine chloride 5 g. (0.036 mol) of choline chloride was suspended in 25 ml. of chloroform and 8.6 g. (0.04 mol) of α-acetoxy-α-phenylacetyl chloride was added thereto. This mixture was refluxed for 7 hours. Then, the reaction mixture was concentrated under reduced pressure to obtain a precipitation of crystals. The crystals were collected and were recrystallized in a methanol-ethyl acetate mixture. 7.9 g. (70%) of hygroscopic white crystals having a melting point of 147° C. to 151° C. were obtained.

The crystals were found to be hygroscopic. They were treated with potassium iodide and a recovery of α-acetoxy-α-phenylacetylcholine iodide was confirmed.

Melting point: 135° to 138° C.

*Elementary analysis.*—Calculated (percent): C, 44.24; H, 5.45, N, 3.45. Found (percent): C, 44.29; H, 5.35; N, 3.45.

Having now fully described the invention, it will be apparent to one of ordinary skill in the art, that many changes and modifications can be made thereto, without departing from the spirit or scope of the invention.

Accordingly, what is claimed as new and desired to be secured by Letters Patent is:

1. Choline derivatives of the following general formula:

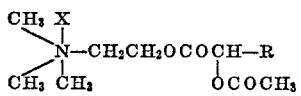

wherein X represents a halogen atom and R represents a lower alkyl group.

2. The compound of claim 1 which is α-acetoxy-α-methyl-acetylcholine chloride.
3. The compound of claim 1 wherein R is ethyl.
4. The compound of claim 1 wherein R is propyl.

References Cited

March: Aso. Organic Chem.: Reactions, Mechanism and Structures, pp. 319–324.

LORRAINE A. WEINBERGER, Primary Examiner

P. J. KILLOS, Assistant Examiner

U.S. Cl. X.R.

260—473 A; 424—311

UNITED STATES PATENT OFFICE
CERTIFICATE OF CORRECTION

Patent No. 3,803,214  Dated April 9, 1974

Inventor(s) Koji Miura et al.

It is certified that error appears in the above-identified patent and that said Letters Patent are hereby corrected as shown below:

Column 1, line 55, "(II)" should read -- (III) --.

Signed and sealed this 1st day of October 1974.

(SEAL)
Attest:

McCOY M. GIBSON JR.
Attesting Officer

C. MARSHALL DANN
Commissioner of Patents